R. A. ECKBERG.
DEMOUNTABLE RIM.
APPLICATION FILED AUG. 9, 1915.
1,191,577.
Patented July 18, 1916.
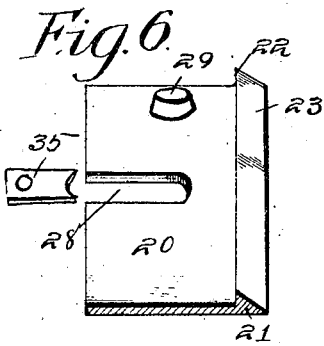
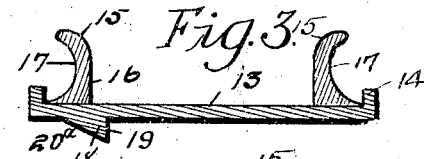
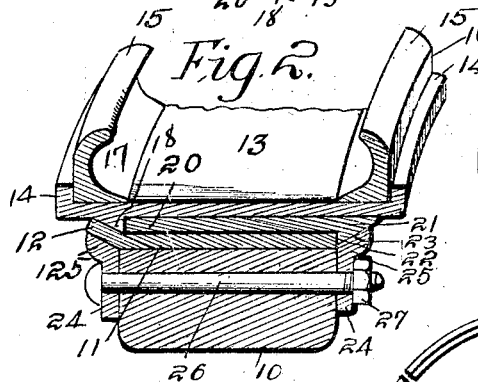
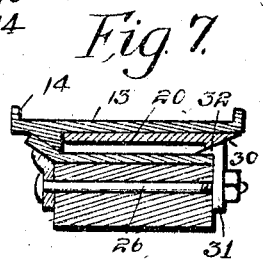
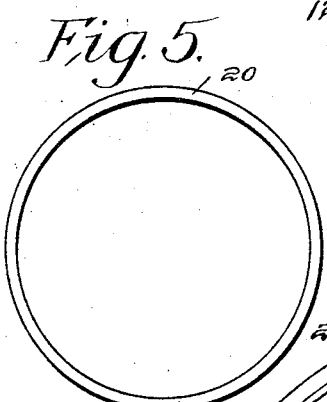
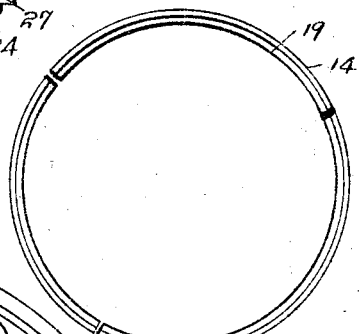
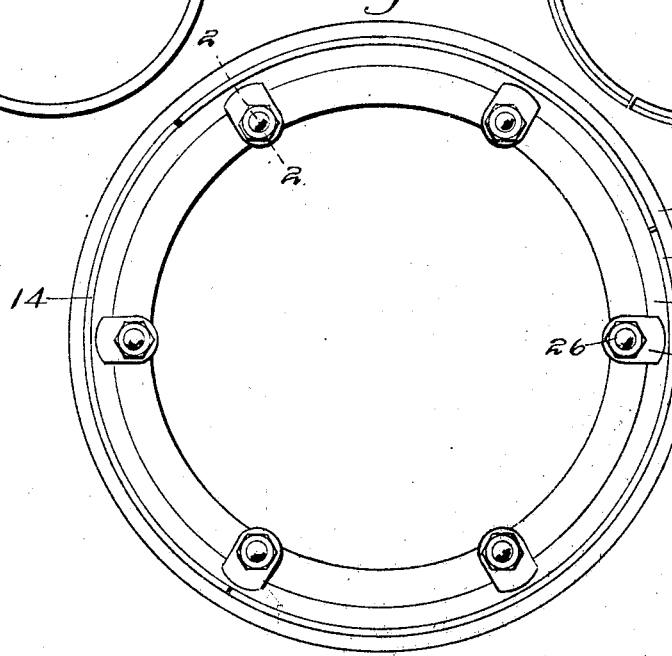
Witnesses
A. G. Hague
Adele Sherman
Inventor
Rudolph A. Eckberg
by Orwig & Bair Attys

UNITED STATES PATENT OFFICE.

RUDOLPH A. ECKBERG, OF DES MOINES, IOWA.

DEMOUNTABLE RIM.

1,191,577.

Specification of Letters Patent.

Patented July 18, 1916.

Application filed August 9, 1915. Serial No. 44,644.

*To all whom it may concern:*

Be it known that I, RUDOLPH A. ECKBERG, a citizen of the United States, and resident of Des Moines, in the county of Polk and State of Iowa, have invented a certain new and useful Demountable Rim, of which the following is a specification.

My invention relates to automobile rims for use with pneumatic tires.

It is my object to provide a demountable rim of this type of comparatively cheap and simple construction, which can be quickly and easily assembled and mounted on a wheel, and is quickly and easily removed therefrom and taken apart.

A further object is to provide such a rim adapted to be made in sections and having means for locking said rim on the wheel with ordinary locking devices.

More particularly it is my object to provide a rim which can be made in sections and when the casing is placed there n can be locked on a wheel by means of a single continuous band and ordinary locking lugs.

A further object is to provide in such an automobile rim continuous flange members which are detachable and adapted when standing in different positions to fit either clencher tires or the ordinary straight side tires.

My invention consists in the construction, arrangement and combination of the various parts of the device whereby the objects contemplated are attained as hereinafter more fully set forth, pointed out in my claim and illustrated in the accompanying drawings, in which:

Figure 1 shows a wheel equipped with an automobile rim embodying my invention. Fig. 2 shows a detail sectional view of the same taken on the line 2—2 of Fig. 1. Fig. 3 shows a vertical sectional view taken through the rim and the tire holding flanges thereon. Fig. 4 shows a side elevation of the rim and one of the flanges thereon. Fig. 5 shows a side elevation of the continuous band. Fig. 6 shows a perspective view of a small portion of the continuous band showing the slot for the flat casing and the lug for preventing creeping of the band, and Fig. 7 shows a vertical sectional view through a slightly modified form of my device.

In the accompanying drawings, I have illustrated a form of my invention in which I have used the reference numeral 10 to indicate generally the felly of the wheel. On the outer surface of the felly 10 is an annular protecting member 11, having at one edge an outwardly inclined flange 12.

My improved rim is made in two or more sections, each of which comprises a flat member 13 having at its side edges outwardly extending flanges 14. I provide continuous rings or flange members 15 adapted to rest on the outer surface of the rim sections 13, as shown in Figs. 2 and 3, and engage and hold a tire. The flanges or rings 15 are formed with flat substantially vertical surfaces 16 on one side, and with concave surfaces 17 on the other side to fit respectively flat edged tires or clencher tires.

It will be seen that by placing the members 15 in one position with their concave faces inwardly, as shown in Fig. 2, the rim is adapted for use with clencher tires, while by reversing the position of the members 15, as shown in Fig. 3, my rim may be used with flat sided tires.

On the lower surface of the rim sections 13, near one side thereof, is a downwardly projecting member 18 having a vertical surface or shoulder 19 and an outer beveled surface 20$^a$, as clearly shown in Figs. 2 and 3. The beveled shoulder is adapted to rest on the outwardly inclined flange 12, as shown in Fig. 2. The members 15 are placed on the tire, the sections of my improved rim 13 are placed together end to end. A continuous flat annular ring 20 is inserted from the side opposite the member 18 until it engages the shoulder. The annular ring 20 has near its outer edge an inwardly extending member 21, having an inner vertical shoulder 22, and an outer beveled surface 23. The tire is inflated, and the pressure will be radially inward, whereby the parts of the rim are held together in proper position by friction. The tire and rim are then placed on the wheel upon which the shoulder 22 engages the side edge of the member 11 opposite the flange 12.

For securing the rim in position on the wheel, I use lugs 24, adapted to engage the side of the felly 10 and having outwardly inclined beveled portions 25 adapted to engage respectively the inner surfaces of the flange 12 and the inclined portion 23.

A bolt 26 is extended through the body portions of the lugs 24 and through the felly 10, and is held in position by means of a nut 27. The lugs 24 when the parts are installed, as hereinbefore described, will prevent any lateral sliding of the rim. As many of the bolts 26 and lugs 24 may be employed as desired.

The annular ring 20 is provided with a slot 28 extending from its side edge opposite the member 21 inwardly to a sufficient distance to receive the valve of the inner tube. One of the members 13 may be provided with a plate 35 to fit into the slot 28, having a curved inner end to fit the valve stem. A lug 29 may be formed or placed on the inner surface of the annular ring 20 to engage a suitable groove in the member 11, to prevent circumferential creeping on the annular ring.

In Fig. 7, I have shown a slightly modified form of my invention, in which the ring 20 is provided with a downwardly extending portion having an outer beveled surface 30. The parts are assembled and constructed similarly to those already described, except that a special lug is provided having a body portion 31 through which the bolt 26 is extended, and has at its upper end the inwardly inclined wedge member 22, the upper beveled surface of which engages and coacts with the beveled surface 30. It will thus be seen that the member 20 is slightly spaced from the member 11. The rim, however, is held on and supported in the same way against lateral movement.

My improved automobile rim is unusually inexpensive to manufacture, and I believe it to have very great advantages, in that no expensive or complicated locking means are necessary for connecting the adjacent ends of the rim sections 13.

The rim can be assembled with the member 20 and with the tire thereon, and may be quickly and easily slid on the wheel as assembled, when the form used in Fig. 7 is used. When either form is employed, the member 20 is inserted laterally before the rim has been placed on the wheel.

I appreciate the fact that slight changes may be made in the arrangement and construction of the parts of my demountable rim, as for instance in the construction shown in Fig. 7, as compared with the construction shown in Fig. 2, and I intend by my present application to cover any such changes in construction and arrangement as may be included within the scope of my appended claim.

I claim as my invention.

In a demountable rim, a rim having ends adapted to be adjacent to each other to form a continuous rim, continuous side rings for preventing outward expansion of the rim, a continuous band or ring adapted to engage the inner surface of said rim, said rim having a shoulder adapted to engage one edge of said band, said band having at one edge a portion adapted to be engaged by a locking lug.

Des Moines, Iowa, July 14, 1915.

RUDOLPH A. ECKBERG.

Witnesses:
A. SHERMAN,
WILL FREEMAN.